US007649891B2

(12) United States Patent
Väänänen et al.

(10) Patent No.: US 7,649,891 B2
(45) Date of Patent: Jan. 19, 2010

(54) COMBINED CUSTOMER-FLOW AND QUALITY-CLASS-BASED SCHEDULING METHOD AND APPARATUS FOR SCHEDULING TRANSMISSION-LINK CAPACITY BETWEEN PACKET-SWITCHED TRAFFIC FLOWS

(75) Inventors: Janne Väänänen, Espoo (FI); Marko Kalevi Kulmala, Espoo (FI)

(73) Assignee: Tellabs Oy, Espoo (FI)

( * ) Notice: Subject to any disclaimer, the term of this patent is extended or adjusted under 35 U.S.C. 154(b) by 608 days.

(21) Appl. No.: 11/295,481

(22) Filed: Dec. 7, 2005

(65) Prior Publication Data
US 2006/0126637 A1 Jun. 15, 2006

(30) Foreign Application Priority Data
Dec. 9, 2004 (FI) ............................... 20041586 U

(51) Int. Cl.
H04L 12/28 (2006.01)
H04L 12/54 (2006.01)
(52) U.S. Cl. ............................ 370/395.21; 370/395.43; 370/412; 370/428
(58) Field of Classification Search ................. 370/351, 370/389, 395.1, 396, 397, 398, 395.21, 395.3, 370/395.41, 395.42, 395.43, 395.5, 395.51, 370/395.52, 428, 429, 412, 468, 395.2, 395.4, 370/352
See application file for complete search history.

(56) References Cited

U.S. PATENT DOCUMENTS

2002/0039352 A1* 4/2002 El-Fekih et al. ............. 370/252
2002/0120720 A1* 8/2002 Moir .......................... 709/220

(Continued)

FOREIGN PATENT DOCUMENTS

EP 1 093 266 A2 4/2001

(Continued)

OTHER PUBLICATIONS

RFC 2475, Internet Engineering Task Force (IETF): *An Architecture for Differentiated Services*, Dec. 1998.

(Continued)

*Primary Examiner*—Hanh Nguyen
(74) *Attorney, Agent, or Firm*—Birch, Stewart, Kolasch & Birch, LLP

(57) ABSTRACT

The invention relates to a method and apparatus for scheduling transmission-link capacity between packet-switched telecommunications flows, in such a way that it is possible to guarantee that packets representing delay-critical traffic will be scheduled to the transmission link (S0) before packets representing non-delay-critical traffic and, in addition, that it is possible to limit the joint transmission speed of specific service-quality classes of an individual customer flow. The invention is based on the service-quality classes being separated into two different categories: a service-quality-class based scheduling branch (C) and a customer-flow based scheduling branch (F). When selecting the next packet to be forwarded, one of the two said branches (C or F) is selected and in the service-quality-class based scheduling branch a service-quality class (CoS) is selected and, within the selected service-quality class, a customer flow (CF) is selected and in the customer-flow based scheduling branch a customer flow (CF) is selected and, within the selected customer flow, a service-quality class (CoS) is selected.

6 Claims, 4 Drawing Sheets

U.S. PATENT DOCUMENTS

2002/0122422 A1 9/2002 Kenney et al.

FOREIGN PATENT DOCUMENTS

| EP | 1093266 A2 * | 4/2001 |
| --- | --- | --- |
| WO | WO-01/24428 A1 | 4/2001 |
| WO | WO-02/33428 A1 | 4/2002 |
| WO | WO-03/039052 A2 | 5/2003 |

OTHER PUBLICATIONS

Pawan Goyal, Harric M. Vin, Halchen Chen. *Start-time Fair Queuing: A Scheduling Algorithm for Integrated Services Packet Switching Networks*. Technical Report TR-96-02, Department of Computer Sciences, University of Texas Austin, 1996.

P.F. Chimento, *Standard Token Bucket Terminology*, <http://qbone.internet2.edu/bb/Traffic.pdf>, May 18, 2000.

* cited by examiner

COMBINED CUSTOMER-FLOW AND QUALITY-CLASS-BASED SCHEDULING METHOD AND APPARATUS FOR SCHEDULING TRANSMISSION-LINK CAPACITY BETWEEN PACKET-SWITCHED TRAFFIC FLOWS

The present invention relates to a method, according to the preamble of Claim 1, for scheduling transmission-link capacity between packet-switched traffic flows.

The present invention also relates to an apparatus, according to the preamble of Claim 4, for scheduling transmission-link capacity between packet-switched traffic flows.

In the present document, the following abbreviations are used in the descriptions of both the prior art and the invention:

CF Customer Flow, a traffic flow, which represents, for example, a specific virtual network (VPN, Virtual Private Network),
CoS Class of Service,
DSCP Differentiated Service Code Point, the information carried by a packet concerning the class of service to which the packet in question belongs,
PCQ Per Class Queuing, queuing and scheduling discipline, in which queuing is implemented service-class-specifically and transmission-capacity scheduling is based on service-quality classes,
PFQ Per Flow Queuing, queuing discipline, in which queuing is implemented customer-flow and service-class-specifically,
PFQ-CS Per Flow Queuing—Class-based Scheduling, queuing and scheduling discipline, in which queuing is implemented customer-flow and service-class specifically and scheduling is implemented service-class specifically,
PFQ-FS Per Flow Queuing—Flow-based Scheduling, queuing and scheduling discipline, in which queuing is implemented customer-flow and service-class specifically and scheduling is implemented customer-flow specifically.

In a packet-switched telecommunications system, it is often advantageous for the telecommunications packet (Pkt, FIG. 1, hereinafter 'packet') being transmitted to be classified as belonging to different classes of service (CoS) according to the kind of requirements that the applications using telecommunications service have, and, on the other hand, according to what kind of service-quality agreements the telecommunications service provider has made with its customers. For example, in the case of a conventional telephone service, it is important for the data-transmission speed of the application has sufficient time available and that the transmission delay is sufficiently small, and that the variation in the delay is sufficiently small. In a telephone application, there is no benefit in being able to momentarily increase the data-transmission speed provided for the application, if the loading of the telecommunications network is low at the time in question. On the other hand, when downloading web-pages, for example, it is very advantageous if the available capacity of the network can be exploited in full even momentarily.

By way of example, a situation will be examined, in which a telecommunications service provides the following kinds of service-quality classes:

Class of service CoS3: the highest priority class for applications, for which the data-transmission delay and the variation in the transmission delay are sought to be minimized, but the momentary data-transmission speed provided for the application is not increased, even though the loading of the telecommunications system may be low at the time in question. The amount of traffic representing the service-quality class CoS3 is assumed to be limited.

Class of service Cos2: the second-highest priority class for applications, for which the data-transmission delay and the variation in the transmission delay are sought to be minimized, but the momentary data-transmission speed provided for the application is not increased, even though the loading of the telecommunications system may be low at the time in question. The amount of traffic representing the service-quality class CoS2 is assumed to be limited.

CoS1: for applications, for which upper-limit values are not guaranteed for the transmission delay and variation in the delay, but for which a specific minimum transmission capacity is guaranteed and for which the available capacity of the data transmission system at each moment is exploited.

CoS0: for applications, for which upper-limit values are not guaranteed for the transmission delay and variation in the delay, and for which a data transmission capacity is not guaranteed, but for which the available capacity of the data transmission system at each moment is exploited.

By way of example, the following situation shown in FIG. 1 will be examined, in which packets addressed to customers A1 and A2 are received in the network element NE1 over the data-transmission link T. The flow of packets addressed to a specific customer forms a customer flow CF going to the customer in question. The customer flows CF1 and CF2 going to the customers A1 and A2 are transmitted from the network element NE1 to the network element NE2 over the transmission link S0. The customer flow CF1 is forwarded from the network element NE2 over the transmission link S1 and the customer flow CF2 over the transmission link S2. Both of the customer flows CF1 and CD2 contain service-quality classes Cos3, CoS2, Cos1, and CoS0. The network element NE1 is able to taken the service-quality class into account when scheduling the packets to the transmission link S0 (implements the Differentiated Service method [1]). The network element NE2 processes all the services classes in the same way (does not implement the Differentiated Service method [1]). The traffic representing the service-quality class CoS3 of customer A1 is assumed to be limited earlier in the network, before the network element NE1, to the value MaxA1CoS3 [bit/s]. Correspondingly, the traffic representing the service-quality class CoS2 is assumed to be limited to the value MaxA1CoS2. Correspondingly, the upper-limit values for customer A2 are: MaxA2CoS3 and MaxA2CoS2.

The objective is the following:

The capacity of the transmission link S0 should be divided in the desired ratio between the customer flows CF1 and Cf2.

A packet representing a higher priority will be transmitted over the transmission link S0 before a packet representing a lower priority (CoS3 before CoS2, CoS1, and CoS0, correspondingly CoS2 before CoS1 and CoS0).

The traffic shares representing service-quality classes CoS1 and CoS0 of customer flows CF1 and CF2, which have not been limited earlier in the network, must be able to be limited in the network element NE1, so as not to congest the output ports of the network element NE1 to the transmission links S1 and S2. This is important, because, in a congestion situation, when dropping packets NE2 will not be able to distinguish between packets representing different service-quality classes.

FIG. 2 shows one way according to the prior art of scheduling the capacity of the transmission link in a situation like that in the above example. The procedure shown by FIG. 2 will be referred to in the following as customer-flow-based scheduling (Per Flow Queuing—Flow-directed Scheduling, PFQ-FS). The operation of the system shown in FIG. 2 is as follows:

the customer flow (CF) and service-quality class (CoS) to which a packet arriving in the system belongs, determines the storage buffer in which the packet in question is placed. The customer flow can be identified on the basis of data inside the packet and/or transported in connection with it and/or of the input port of the network element (NE1). The service-quality class can be identified on the basis of information attached to the packet (for example, DSCP=Differentiated Services Code Point [1]).

In the selection process, the customer flow (CF1 or CF2) is selected and, within the selected customer flow, the service-quality class (CoS3, CoS2, CoS1, or CoS0) is selected. A customer flow will be a candidate in the selection, if there is a packet in even one storage buffer relating to the customer flow in question. The customer-flow selection 'select CF' is implemented using a weighting-factor-based scheduling method (for example, Start Time Fair Queuing [2]) while the selection of the service-quality class 'select CoS' can be implemented, for example, as follows: 1) if a packet representing service-quality class CoS3 is offered, always select it, if not, then 2) if a packet representing service-quality class CoS2 is offered, select it, if not, then 3) perform the selection between the service-quality classes CoS1 and CoS0, using a weighting-factor-based scheduling method (for example, Start Time Fair Queuing [2]).

The selection of the customer flow during a specific selection cycle is prohibited using a limiter R, if the outgoing traffic representing the customer flow in question exceeds the speed limits [bit/s or packet/s] set for it. Speed monitoring can be implemented, for example, using the traditional Token-Bucket method [3].

The problem with the method shown in FIG. 2 is that, in the customer flow selection 'select CF', the weighting-factor-based scheduling method used processes the customer flows (CF1 and CF2) offered to the scheduler in such a way that both receive the share of the capacity of the transmission link S0 reserved for them. If, for example, only packets representing service-quality class CoS3 are going to customer A1 and only packets representing service-quality class CoS0 are going to customer A2, there is no guarantee that a CoS3 packet will be scheduled to the transmission link before a CoS0 packet. Taken generally, the scheduling order is random. Because the CoS3 packets represent delay-critical traffic, they should, however, always be scheduled to the transmission link S0 before the CoS0 packets.

FIG. 3 shows a second way according to the prior art to schedule the capacity of a common transmission link in the case of a situation like that in the example described above. Hereinafter, the procedure shown in FIG. 3 will be referred to as service-quality-class-based scheduling (Per Flow Queuing-Class—directed Scheduling, PFQ-CS). The operation of the system shown in FIG. 3 is as follows:

the customer flow (CF) and service-quality class (CoS) to which a packet arriving in the system belongs, determines in which storage buffer the packet in question will be placed.

In the selection process, the service-quality class (CoS3, CoS2, CoS1, or CoS0) is selected and the customer flow (CF1 or CF2) is selected inside the selected service-quality class. A service-quality class will be a candidate in the selection, if there is a packet in even one storage buffer relating to the service-quality class in question. A customer flow will be a candidate in the selection, if there is a packet in the selected service-quality class and a storage buffer representing the customer flow in question. The selection of the customer flow 'select Cf' is implemented using a weighting-factor-based scheduling method (for example, Start Time Fair Queuing [2]) while the selection of the service-quality class 'select CoS' can be implemented, for example, as follows: 1) if a packet representing the service-quality class CoS3 is offered, it will always be selected, if not, 2) then if a packet representing the service-quality class CoS2 is offered, it will be selected, if not, 3) then the selection is made between the service-quality classes CoS1 and CoS2, using a weighting-factor-based scheduling method (for example, Start Time Fair Queuing [2]).

The selection of the customer flow during a specific selection cycle is prohibited using a limiter R, if the outgoing traffic representing the service-quality class and customer flow being examined exceeds the speed limits [bit/s or packet/s] set for it. Speed monitoring can be implemented, for example, using the traditional Token Bucket method [3].

A problem with the method shown in FIG. 3 is that the customer flow cannot be limited in such a way that the speed-limited share of the customer flow would include several service-quality classes and that the speed limit does not say anything about how the speed-limited traffic flow is distributed between the various service-quality classes. In a situation like that of the example given, it would be advantageous, if it would be possible to speed-limit the share of the totality of a customer flow (CF1, CF2) represented by the service-quality classes CoS1 and CoS0, without separately limiting the shares represented by the service-quality classes CoS1 and CoS0.

The invention is intended to eliminate the defects of the state of the art disclosed above and for this purpose create an entirely new type of method and apparatus for scheduling transmission-link capacity between packet-switched telecommunications traffic flows. The invention relates to a method, using which a scheduling mechanism can be implemented, in such a way that it is possible to guarantee that packets representing delay-critical traffic will be scheduled to the transmission link before packets of non-delay-critical traffic and, in addition, that it is possible to speed limit the general effect of specific service-quality classes of a customer flow (such as CoS1 and CoS0 in the example situation depicted above).

The invention is based on performing the scheduling for specific service-quality classes (for example, delay-critical service-quality classes) using quality-class-based scheduling (PPQ-CS) and, on the other hand, performing scheduling for other service-quality classes (for example, non-delay-critical service-quality classes) using customer-flow-based scheduling (PPQ-FS).

In the system according to the invention, the selection processes can be implemented using either a programmable processor or microcircuit mechanisms designed for the operations in question (Application Specific Integrated Circuit 'ASIC' implementation).

The method according to the invention is characterized by what is stated in the characterizing portion of Claim 1.

The apparatus according to the invention is, in turn, characterized by what is stated in the characterizing portion of Claim 4.

With the use of the invention, the advantage is gained over the solutions according to the prior art that it is possible to implement the scheduling mechanism in such a way that it is possible to guarantee that packets representing delay-critical traffic will be scheduled to the transmission link before packets representing non-delay-critical traffic and, in addition, it is possible to speed limit the joint transmission speed of specific service-quality classes of a customer flow.

In the following, the invention is examined in great detail with the aid of examples according to the accompanying drawings.

The basis of the method according to the invention will become apparent from the following examination.

Figure 1:
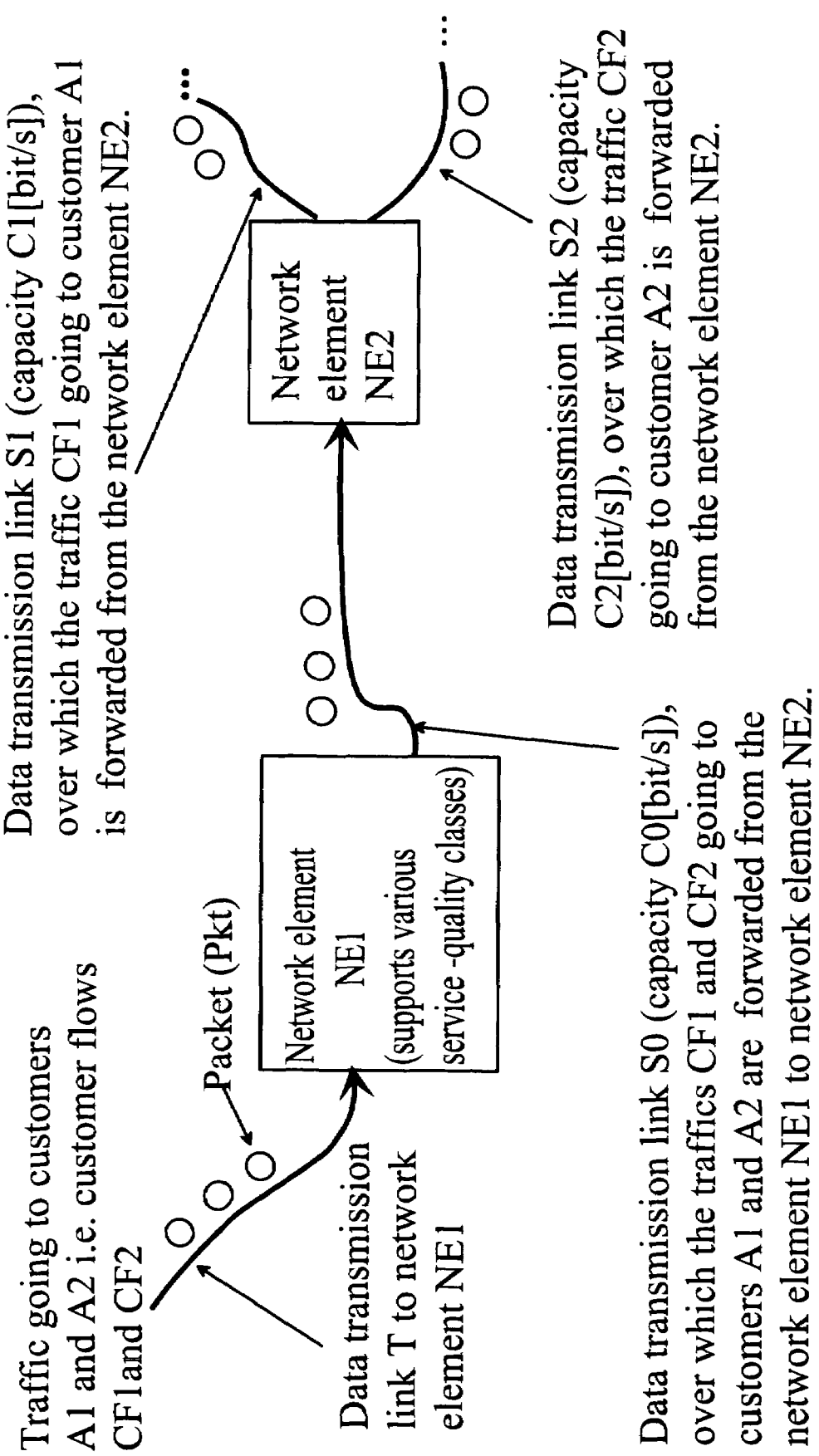
FIG. 1 shows a packet-switched telecommunications network used as an example for examination. The telecommunications packets addressed to the customers A1 and A2 are scheduled in a network element NE1 to a packet forwarding data transmission link S0.
Figure 2:
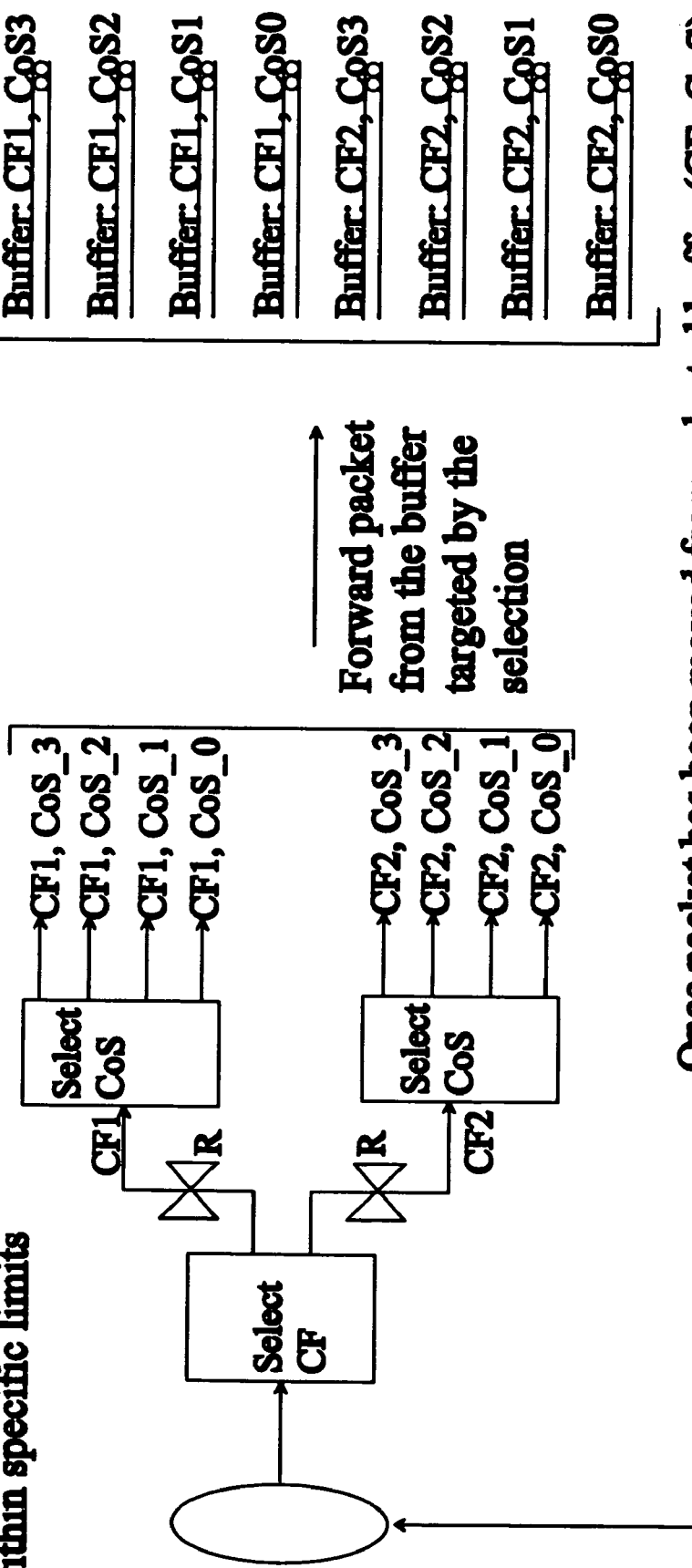
FIG. 2 shows a block diagram of one system according to the prior art for scheduling the capacity of the transmission link S0 for traffic flows formed of packets representing the customers A1 and A2 and the aforementioned service-quality classes (CoS3, CoD2, CoS1, and CoS0).
Figure 3:
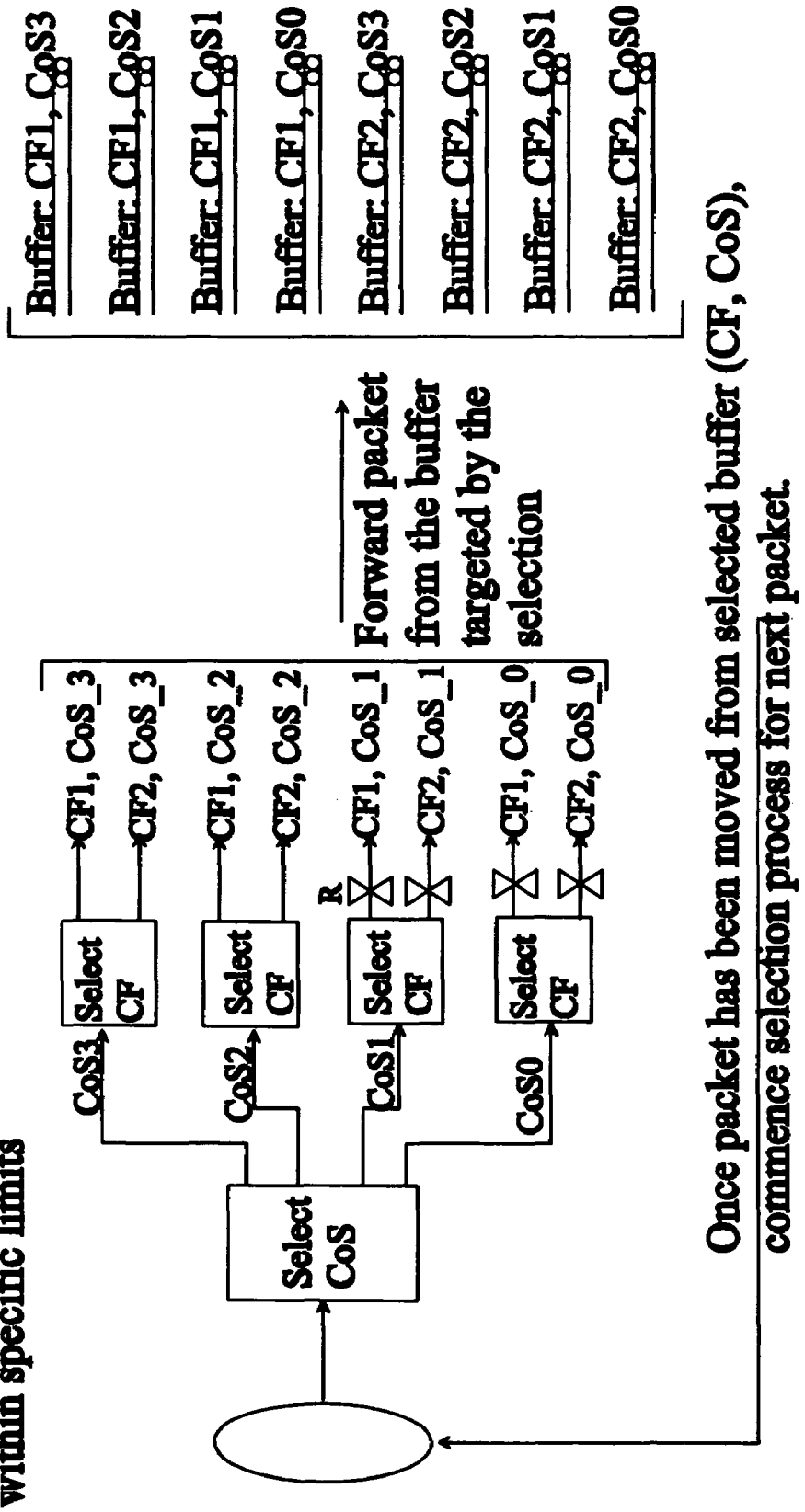
FIG. 3 shows a block diagram of a second system according to the prior art for scheduling the capacity of the transmission link S0 for traffic flows formed of packets representing the customers A1 and A2 and the aforementioned service-quality classes (CoS3, CoD2, CoS1, and CoS0).
Figure 4:
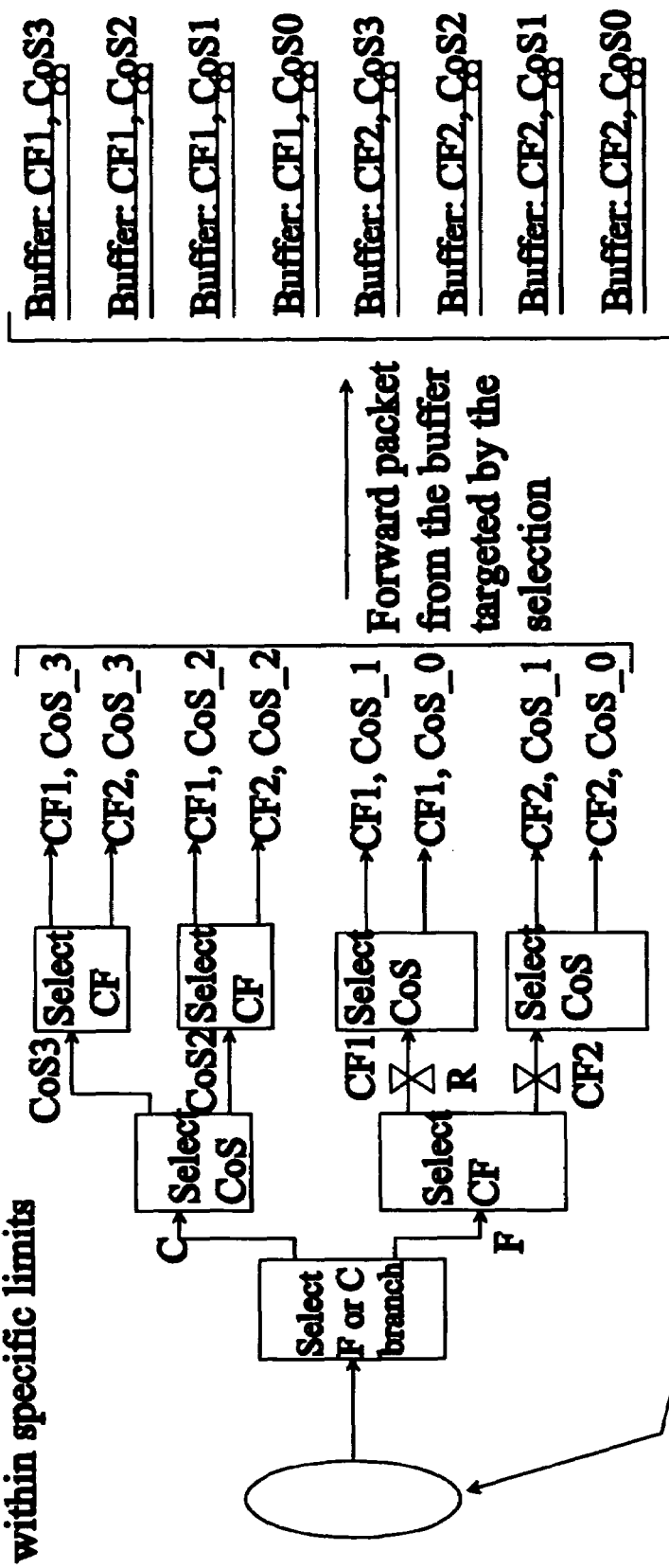
FIG. 4 shows a block diagram of a second system according to the invention, in an example of an operating environment, prior art for scheduling the capacity of the transmission link S0 for traffic flows formed of packets representing the customers A1 and A2 and the aforementioned service-quality classes (CoS3, CoD2, CoS1, and CoS0).

In the method according to the invention, the service-quality class belongs to either to a branch (C, FIG. 4) based on service-quality class, or to a branch (F, FIG. 4) based on customer flow. In the service-quality-class-based scheduling branch (C) the scheduling is implemented by selecting the service-quality class and selecting the customer flow within the selected service-quality class. In the customer-flow-based scheduling branch (F), scheduling is implemented by selecting a customer flow and selecting the service-quality class within the selected customer flow.

One preferred embodiment of the present invention is a system, in which the service-quality classes (CoS3 and CoS2) representing traffic that is delay-critical and assumed to be preliminary limited are placed in the branch (C) that schedules on the basis of service-quality class and the service-quality classes (CoS1 and CoS0) representing traffic that is non-delay-critical and assumed to be preliminary unlimited is placed in the branch (F) that schedules on the basis of customer. The selection between the said branches is performed on the basis on priority, in such a way that the service-quality-class-based scheduling branch (C) is always selected, if there is packet in even one storage buffer relating to the branch (C) in question, otherwise the customer-flow-based scheduling branch (F) is selected.

REFERENCES

[1] RFC 2475, Internet Engineering Task Force (IETF): *An Architecture for Differentiated Services*.

[2] Pawan Goyal, Harric M. Vin, Haichen Chen. *Start-time Fair Queuing: A Scheduling Algorithm for Integrated Services Packet Switching Networks*. Technical Report TR-96-02, Department of Computer Sciences, University of Texas Austin.

[3] P. F. Climento, *Standard Token Bucket Terminology*. http://qbone.internet2.edu/bb/Traffic.pdf2000.

The invention claimed is:

1. Method for scheduling transmission-link capacity between packet-switch telecommunications flows in a telecommunications network element, the method comprising:

transmitting digital data as constant or variable-length packets, attaching first identifier data to each packet, and classifying said packet, with the aid of said first identifier data, as belonging to one of at least two service-quality classes, attaching second identifier data to each packet, and classifying said packed, with the aid of said second identifier data, as belonging to one of at least two customer flows, wherein said second identifier data is defined on the basis of data inside the packet and/or transported in connection with it and/or on the basis on the input port of the network element, associating each service-quality class with either a branch scheduling on the basis of service-quality class, or to a branch scheduling on the basis of customer flow, relating a storage buffer to each customer-flow/service-quality class pair, in which the packets corresponding to the said customer-flow/service-quality class pair arriving in the network element are stored, selecting a packet to be forwarded from among the packets that are offered for forwarding, and forwarding said selected packet from the network element over an outgoing telecommunications link, and, when the transmission has terminated, selecting the following packet, wherein, when selecting the packet to be forwarded:

either the service-quality-class based scheduling branch or the customer-flow based scheduling branch is selected and in the service-quality-class based scheduling branch a service-quality class is selected and within the selected service-quality class a customer flow is selected and in the customer-flow based scheduling branch a customer flow is selected and within the selected customer flow a service-quality class is selected and the selection between the service-quality-class based scheduling branch and the customer-flow based scheduling branch is performed on the basis of priority, in such a way that the service-quality-class based scheduling branch is always selected, if there is a packet in even one storage buffer relating to the service-quality-class based scheduling branch, otherwise the customer-flow based scheduling branch is selected.

2. Method according to claim 1, wherein the customer flow is selected using a weighting-factor based scheduling method (e.g., Start Time Fair Queuing, [2]).

3. Method according to claim 1, wherein the service-quality classes representing delay-critical traffic belong to the service-quality-class based scheduling branch and the service-quality classes representing non-delay-critical traffic belong to the customer-flow-based scheduling branch.

4. Apparatus for scheduling transmission-link capacity between packet-switched telecommunications flows in a telecommunications network element, in which the apparatus comprises a reception unit that receives constant or variable-length packets carrying digital information, a service-quality class information definition unit that defines-service-quality class information for the packet, a customer-flow information definition unit that defines customer-flow information for the packet, a classification unit that classifies each service-quality class as belonging to either the service-quality-class based scheduling branch or the customer-flow based scheduling branch, a storage buffer for each service-quality class/customer-flow pair, a selection unit that selects one packet from among the packets that are offered for forwarding, a forwarding unit that forwards the selected packet over the outgoing telecommunications link, and a scheduling branch selection unit that selects, when the selection unit is selecting a packet to be forwarded, the service-quality-class based scheduling branch always, if there is a packet in even one storage buffer relating to the service-quality-class scheduling branch, and in other cases the customer-flow based scheduling branch, and that selects, in the service-quality-class based scheduling branch, a service-quality class and within the selected service-quality class, selects a customer flow, and that selects, in the customer-flow based scheduling branch, a customer flow and within the selected customer flow selects a service-quality class.

5. Apparatus according to claim 4, wherein the scheduling branch selection unit includes a weight-factor based scheduler that selects the customer flow using a weighting-factor based scheduling method.

6. Apparatus according to claim 4, wherein the apparatus comprises classification unit that classifies the service-quality classes representing delay-critical traffic to the service-quality-class based scheduling branch and classifies the service-quality classes representing non-delay-critical traffic to the customer-flow based scheduling branch.

* * * * *